May 3, 1966     A. O. DE HART ETAL     3,249,391

CONNECTING ROD BEARING ASSEMBLY

Filed June 13, 1962

INVENTORS
Arnold O. DeHart, &
Alfred W. Schluchter
BY
ATTORNEY

3,249,391
CONNECTING ROD BEARING ASSEMBLY
Arnold O. De Hart, Warren, and Alfred W. Schluchter, Dearborn, Mich., assignors to General Motors Corporation, Detroit, Mich., a corporation of Delaware
Filed June 13, 1962, Ser. No. 202,196
7 Claims. (Cl. 308—237)

This invention relates to a connecting rod bearing assembly and particularly to a composite sleeve bearing which is especially useful with connecting rods of internal combustion engines.

As loads on crankshafts in modern gasoline and diesel engines become higher, it is increasingly important to improve the fatigue resistance of connecting rod bearings. Bearings of conventional materials and construction are virtually limited to the loads generated in gasoline engines currently being manufactured. Babbitt bearings, for example, have restricted fatigue strength which substantially limits the loads which can be imposed on connecting rods having bearings of this material. On the other hand, bronze or other copper base alloy bearings have inadequate embedability and antiscore properties for satisfactory use in many engines, such as gasoline engines for motor vehicles.

A principal object of the present invention, therefore, is to provide a connecting rod bearing assembly which will have high load-carrying capacity at those portions of the bearing surface where the connecting rod force is greatest and which will, at the same time, have secondary bearing areas possessing outstanding embedability and score resistance. This is accomplished with a composite sleeve bearing having a heavy load-carrying copper base bearing metal layer throughout most of its bearing surface and areas formed of a soft bearing metal, such as Babbitt, adjacent the parting lines of the sleeve. Such a bearing possesses an optimum combination of fatigue resistance and antiscore properties when properly used with a connecting rod because only a very small portion of the load from the connecting rod is applied near the parting lines of the bearing.

Other objects and advantages of this invention will more fully appear from the following detailed description taken in conjunction with the accompanying drawing in which.

Figure 1:
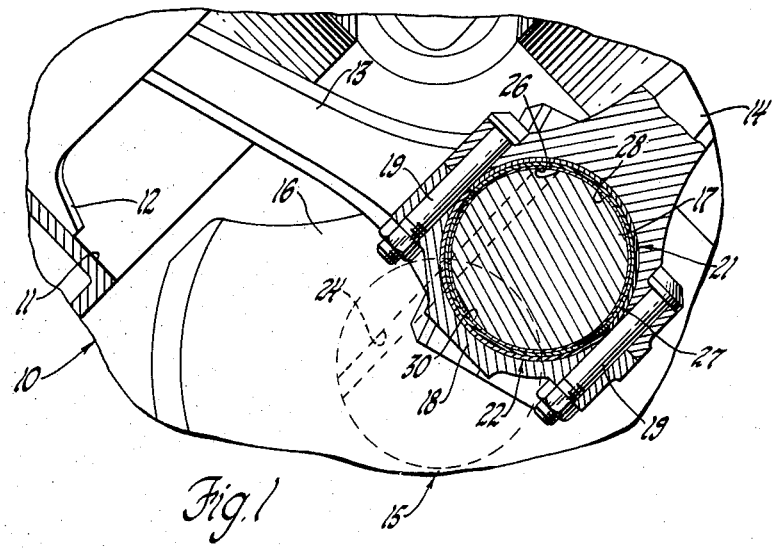
FIGURE 1 is a fragmentary cross-sectional view of an internal combustion engine having a connecting rod bearing assembly embodying the invention.

The engine 10 illustrated in FIGURE 1 is a V-type, multiple cylinder internal combustion engine having cylinders 11 in which pistons 12 are reciprocated in accordance with the timed events of the engine. The pistons are attached by connecting rods 13 and 14 to the crankshaft 15 of the engine. The arms 16 of the crankshaft terminate in crankpins or journals 17 to which the connecting rods 13 and 14 are attached in axially adjacent pairs. Each of the connecting rods includes a bearing cap 18 which is fastened in position by means of suitable bolts 19 to clamp the semi-annular halves 21 and 22 of a composite sleeve bearing or bushing in the crankshaft end of the connecting rod. The concave bearing surfaces of the composite bushing operatively engage the cylindrical surface of the crankshaft journal 17. Each of the crank arms 16 is provided with an oil passage 24 for the cooperating connecting rod of the engine. These oil passages rotate with the crank arms and supply lubricant through ports 26 to areas of the journal surface between the parting lines 27 of the bearing during rotation of the crankshaft.

It can be seen from FIGURE 1 that maximum loads are applied to the bearing at the areas indicated generally at 28 and 30, which are about midway between the parting lines 27 and in approximate alignment with the connecting rod in which the bearing is located. Therefore, these bearing surfaces to which the greatest forces are applied should be formed of a metal which has the necessary bearing properties and strength, particularly fatigue strength, to withstand the heavy pressures. Pure copper and certain copper base alloys have proved to be satisfactory for this purpose. Examples of suitable copper base alloys are those composed of approximately 65% to 75% copper and 25% to 35% lead and a ternary alloy of about 35% lead, 2% tin and the balance copper. For some applications silver, aluminum and aluminum alloys may be substituted for the copper or bronze but, in general, copper is much preferred for automotive connecting rod bearings. Outstanding results have been obtained when oxygen-free high-conductivity copper was used as the principal bearing material.

On the other hand, the bearing surfaces adjacent the parting lines 27 of each half bearing or sleeve 21 and 22 are subjected to relatively low pressures because these surfaces are located generally laterally of the direction of maximum force applied by the connecting rod. It therefore is possible to form these surfaces of a relatively soft metal having low fatigue resistance but excellent embedability. A Babbitt, such as one formed of 95% lead and 5% tin, has proved to be a highly useful bearing material for these low-load areas of the bearing. At the same time, Babbitt possesses superior antiscore properties and desirable frictional characteristics. If desired, a small amount of antimony may be included in the Babbitt, and for some purposes the soft bearing portions may contain indium, cadmium, bismuth or other soft bearing metals.

Figure 2:
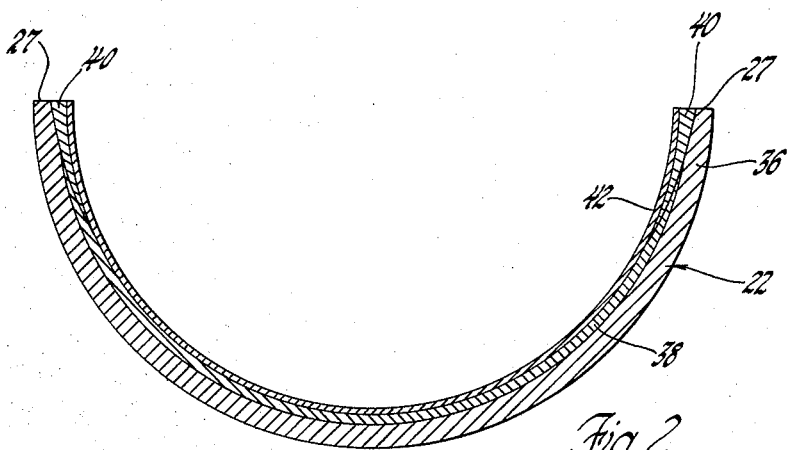
FIGURE 2 is an enlarged cross-sectional view of one of the bushing or sleeve halves of the connecting rod bearing shown in FIGURE 1.
Figure 3:
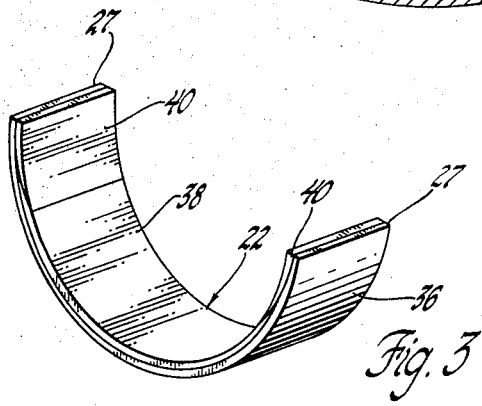
FIGURE 3 is a perspective view of a half bushing similar to the half bushings shown in FIGURES 1 and 2 but without an overlay of soft bearing metal.

Referring to FIGURE 2, each half of the composite bushing is shown as having a steel backing or reinforcing layer 36 which provides it with the strength necessary for use in automotive gasoline engines. The thin layer 38 of copper may be bonded to a flat steel backing sheet by one of the processes described and claimed in United States Patent No. 2,044,897, Boegehold et al., or No. 1,991,539, Boegehold, or it may be bonded to the backing by other conventional cladding procedures. Next, a series of spaced parallel grooves are straddle-milled or otherwise machined in the copper layer 38. As shown in FIGURES 2 and 3, these grooves may extend into the steel backing at the locations which ultimately will be immediately adjacent the parting lines of the multilayer bearing. Babbitt is then preferably cast into the formed grooves and permitted to solidify. The composite sheet thus formed is cut into strips of proper length and width with the formed Babbitt inserts 40 located at the ends of the strips and extending throughout their entire width. These strips are thereafter shaped into the semicylindrical form shown in the drawing, and the copper and Babbitt bearing surfaces are appropriately machined. Finally, a thin layer 42 of soft bearing metal, such as Babbitt, may be formed over the concave bearing surface of the bushing. This thin overlay, which normally would cover both the cast Babbitt areas 40 of the bushing and the heavy load-carrying copper layer 38, can be conveniently applied by electrodeposition.

We have found it desirable to use a steel backing sheet 36 having a thickness of approximately 0.055 inch and a copper layer of about 0.015 inch thick. However, the steel backing may vary considerably in thickness, and sheets 0.03 inch to 0.50 inch thick have proved to be satisfactory. Likewise, the copper bearing layer may range from 0.005 inch to 0.030 inch in thickness. With an automobile connecting rod bearing, the copper layer may be tapered to a slight extent by means of a broaching operation. When this is done, the copper is thickest at the heavy load portions 28 and 30 of the bearing and thinnest adjacent the cast Babbitt portions 40.

As can best be seen in FIGURE 2, the Babbitt portions 40 of the bearing adjacent the parting lines are tapered so that the load-carrying capacity and fatigue resistance of these bearing areas progressively increase from the parting line toward the heavy load portions 28 and 30. The maximum thickness of these cast Babbit portions may be slightly greater than the thickness of the copper bearing layer 38, a maximum thickness between 0.005 inch and 0.040 inch being typical.

As indicated above, it frequently is desirable to deposit a very thin layer of soft bearing metal, such as lead-base Babbitt, over both the copper layer 38 and the cast Babbit portions 40 of the bearing. Such an overlay normally would have a thickness in the order of 0.0005 inch, although a thickness range of about 0.0002 inch to 0.002 inch may be used for various applications. Among the materials which are appropriate for this thin overlay are bismuth, indium, a lead-tin Babbitt and a lead-tin-copper Babbitt. For example, lead and tin may be co-deposited by electrodeposition to provide a Babbitt layer formed of about 90% lead and 10% tin. A co-deposition of an alloy composed of approximately 10% tin, 3% copper and the balance lead also provides good results.

With the construction described above, the cast Babbitt 40 serves to embed the foreign particles which would otherwise detrimentally affect the hard copper areas and also confers score resistance to the bearing both during the break-in period and during long-term operation. This improvement in score resistance is accomplished by having the Babbitt extend circumferentially a sufficient distance from the parting lines so that it contacts the journal 17 during periods of boundary lubrication. However, the Babbitt portions 40 should not extend so far into the heavily loaded areas of the bearing that they will suffer from fatigue due to overload. Hence we have found it desirable to have each of the Babbitt portions 40 extend circumferentially a distance of about ⅛ inch to ¾ inch from the adjacent parting lines of an automotive crankshaft bearing having a diameter of 2 to 2.5 inches.

This approximate ratio of the Babbitt portion size to bearing diameter should be generally maintained with different size bearings, but some variation in ratio is permitted to accommodate differences in bearing geometry. For example, connecting rod bearings usually are not perfectly round but are somewhat elliptical in configuration, with the distance between parting lines being slightly greater than the distance between diametrically opposite surfaces of the bearing at those intermediate areas subjected to greatest bearing loads. Such a bearing should have a somewhat larger cast Babbitt portion 40 than a round bearing. Moreover, if the bearing is provided with split-ring relief (wherein the bearing surface is undercut up to approximately 0.002 inch from the parting line to a distance of about ⅛ inch to ¼ inch from the parting line, the Babbitt portion must necessarily extend circumferentially a distance greater than does the undercut. In general, the circumferential extension of each Babbitt portion 40 should constitute an arc of approximately 3½° to 22°, depending on the foregoing factors.

Various modifications in the arrangement and details of the specific embodiment described and shown herein will be apparent to those skilled in the art and are contemplated as within the scope of the present invention as defined in the appended claims.

We claim:

1. A connecting rod bearing assembly for an internal combustion engine and the like comprising an annular bearing adapted to have heavy loads applied to spaced and oppositely disposed, circumferentially extending inner surface areas of said bearing, said bearing being formed of two semi-annular bushings each having a principal concave bearing surface of hard bearing metal, the concave bearing areas of each of said bushings adjacent the parting lines being formed of a soft bearing metal which decrease in thickness circumferentially inwardly from said parting lines to provide bearing surfaces of progressively increasing hardness from said parting lines to said principal surfaces.

2. A connecting rod bearing assembly for an internal combustion engine and the like comprising an annular bearing adapted to have the principal loads thereon applied on spaced and oppositely disposed portions of circumferentially extending inner surface areas thereof, said bearing being formed of two semi-annular bushings each having a first concave bearing layer, said layer comprising a principal central portion of copper and end portions of soft bearing metal adjacent the parting lines of said bushings, and a second thin layer of Babbitt over said first layer.

3. An annular sleeve bearing for a connecting rod of an internal combustion engine and the like, said sleeve bearing comprising a pair of semi-annular steel backing members, a layer of relatively hard bearing metal having tapered ends on the concave inner surface of each of said backing members, a soft bearing metal portion on each of said concave surfaces at areas adjacent the parting lines of said sleeve bearing and extending throughout the width thereof, each of said soft bearing metal portions extending circumferentially from the adjacent parting line a distance sufficient to constitute an arc of about 3½° to 22°, the inner ends of said soft bearing areas being tapered and overlying the tapered ends of said hard layer to form intermediate areas of progressively increasing hardness, and a thin layer of soft bearing metal covering the concave inner surfaces of said hard bearing metal layers, soft bearing metal portions, and intermediate areas.

4. An annular sleeve bearing for a connecting rod of an internal combustion engine and the like, said sleeve bearing comprising a pair of semi-annular steel backing members, first layer on the inner concave surface of each of said backing members, said first layer comprising a central copper portion and Babbitt portions adjacent the axially extending edges of said backing members and extending throughout the widths thereof, each of said Babbitt portions extending circumferentially a distance of about ⅛ inch to ¾ inch from said edges and faired into said copper portion to form intermediate portions of progressively increasing hardness between said Babbitt portions and said copper portion, and a second thin layer of soft bearing metal on the concave inner surfaces of said first layer.

5. An annular sleeve bearing for a connecting rod of an internal combustion engine and the like, said sleeve bearing comprising a pair of semi-annular steel backing members having their axial end portions tapered in thickness, a layer of relatively hard bearing metal on the concave inner surface of each of said backing members, said layers having a circumferential length less than the circumferential length of the adjacent backing members and having ends tapered in thickness which are contiguous with the tapered ends of said backing members, and a soft bearing metal portion on each of said concave surfaces at areas adjacent the parting lines of said sleeve bearing and extending throughout the width thereof, each of said soft bearing metal portions extending circumferentially from the adjacent parting line a distance sufficient to constitute an arc of about 3½° to 22°, said soft bearing areas being tapered in thickness and overlying the tapered ends of said hard layer and said backing members to form areas of progressively increasing hardness from said parting lines.

6. The combination as claimed in claim 5 wherein a thin layer of soft bearing metal covers said bearing metal layers and said soft bearing metal portions.

7. A connecting rod journal and bearing assembly for an internal combustion engine and the like comprising: an annular bearing adapted to have the principal loads thereon applied on spaced and oppositely disposed portions of circumferentially extending inner surface areas thereof, said bearing being formed of two annular bushings, each having a first concave bearing layer, said first layer comprising a principal central portion of copper, end portions of soft bearing metal adjacent the parting lines of each of said bushings, and intermediate portions between the copper and soft metal portions, said intermediate portions comprising an extension of the copper portion tapered outwardly and an extension of the soft metal portion tapered inwardly and overlying the copper extension, said bushings each having a second thin layer of Babbitt on said first layer.

References Cited by the Examiner

UNITED STATES PATENTS

| | | | |
|---|---|---|---|
| 2,333,227 | 11/1943 | Bagley | 308—237 X |
| 2,341,550 | 2/1944 | Hensel | 308—237 |
| 2,542,405 | 2/1951 | Fink | 308—237 |
| 2,555,497 | 6/1951 | McCullough | 29—149.5 |
| 2,648,580 | 8/1953 | Lignian | 308—237 |
| 2,741,016 | 4/1956 | Roach | 29—149.5 |

FOREIGN PATENTS 549,433  11/1942  Great Britain.

DON A. WAITE, *Primary Examiner.*

FRANK SUSKO, ROBERT C. RIORDON, *Examiners.*

H. S. HIESER, *Assistant Examiner.*